United States Patent [19]

Burleigh

[11] Patent Number: 5,406,908
[45] Date of Patent: Apr. 18, 1995

[54] MODULAR BIRD FEEDER

[76] Inventor: Joseph H. Burleigh, 50 Lawndale Ave, Frankline, N.H. 03235

[21] Appl. No.: 31,641

[22] Filed: Mar. 15, 1993

[51] Int. Cl.$^6$ .......................................... A01K 39/014
[52] U.S. Cl. ...................................................... 119/57.8
[58] Field of Search ............... 119/52.2, 52.3, 52.4, 119/57.8, 53.5, 54

[56] References Cited

U.S. PATENT DOCUMENTS

| D. 231,369 | 4/1974 | Kilham | D30/14 |
|---|---|---|---|
| D. 251,021 | 2/1979 | Blasbalg | D30/15 |
| D. 252,591 | 8/1979 | Hyde, Jr. | D30/1 A |
| D. 325,654 | 4/1992 | Schuetz et al. | D30/128 |
| 3,568,641 | 3/1971 | Kilham | 119/51 |
| 4,259,927 | 4/1981 | Clarke | 119/51 R |
| 4,328,765 | 5/1982 | Kilham | 119/51 R |
| 4,356,793 | 11/1982 | Blasbalg | 119/51 R |
| 4,498,232 | 2/1985 | Gainsboro et al. | 119/51 R |
| 4,691,665 | 9/1987 | Hefner | 119/57.8 X |
| 4,829,934 | 5/1989 | Blasbalg | 119/52 R |
| 4,896,628 | 1/1990 | Kadunce | 119/52.2 |
| 5,044,319 | 9/1991 | Blasbalg | 119/57.9 |
| 5,123,380 | 6/1992 | Edwards | 119/57.8 |

FOREIGN PATENT DOCUMENTS

| 1335678 | 7/1963 | France | 119/52.2 |
|---|---|---|---|

Primary Examiner—Gene Mancene
Assistant Examiner—Thomas Price
Attorney, Agent, or Firm—Michael J. Weins

[57] ABSTRACT

The present invention is for a stackable modular bird feeder module that when the modules are stacked, provides a tube type bird feeder. The basic module has a sidewall with a top rim and a bottom rim. The top rim and the bottom rims are configured such that when the modules are stacked the bottom rim of one unit will engage the top rim of a unit below. The feed sidewall of the units has ports and associated perches which allow the birds to feed. A base attaches to the sidewall and provides a central cavity. A passage in the base is provided to pass feed to the module below and a baffle is attached to the base prevents overflow of the feed through the ports.

30 Claims, 8 Drawing Sheets

MODULAR BIRD FEEDER

FIELD OF INVENTION

The present invention relates to a bird feeder and, more particularly, to a feeder built from stackable modules.

BACKGROUND OF THE INVENTION

A variety of bird feeders based on a tube design is available. Typical of these tube feeders are:

| | |
|---|---|
| Des. 231,369 | P. Kilham |
| 3,568,641 | P. Kilham |
| Des. 251,021 | M. Blasbalg |
| 4,356,793 | M. Blasbalg |

The bird feeders of the above patents all have baffles to avoid overflow of the feed through the feeding ports. Each of these patents teach the use of baffles which are connected to the sidewall of the feeder. The baffles being connected to the walls make effective cleaning of the bird feeder difficult since the baffles should be disconnected from the sidewall to facilitate cleaning.

U.S. Pat. No. 4,259,927 discloses a bird feeder that has a baffle which is free standing with respect to the sidewall of the tube and thus can be removed. However, the position of the baffle necessitates that all ports be near the bottom of the feeder, limiting the number of ports which can be accommodated. Furthermore, the feeder of the '927 patent employs a substantial number of small parts which must be disassembled and reassembled during cleaning, thus, making cleaning difficult. The cleaning is further complicated since the baffle is free standing and the ground feed can become lodged between the baffle and the sidewall. If this ground feed which is lodged between the baffle and sidewall becomes damp, it will create a paste further complicating the removal of the baffle.

Tube style feeders with perches, designed to limit the size of birds which can feed from the feeder are taught by U. S. Patents:

| | |
|---|---|
| 4,328,765 | P. Kilham |
| 4,498,423 | Gainsboro et al. |

The '423 patent also teaches a quick release top using a bayonet type release. However, the feeders of the '765 and the '423 patents, while offering additional features for tube feeders, still suffer from the problem of not being easily cleaned.

Des. 252,591 by Hyde Jr. discloses a bird feeder with overhangs to protect the port from water collecting on the sidewall. However, the '591 patent still requires baffles which attach to the sidewall making cleaning difficult.

U. S. Pat. No. 4,829,934, illustrates a tube feeder which couples into a base for pole mounting with a bayonet type coupling. However, the feeder of the '934 patent has, like the above discussed tube feeder, baffles which attach to the sidewall of the tube.

Thus, there is a need for a simple tube type feeder that can be readily cleaned. Furthermore, none of the above patents provide a bird feeder which is modular and provide flexibility in the feeder's size to meet the needs of local bird populations.

OBJECTS OF THE INVENTION

It is an object of the invention to provide a bird feeder which can be readily cleaned.

It is another object of the invention to provide a bird feeder that can be expanded to meet the needs of the bird population.

It is yet another object to provide a bird feeder that can be readily produced by injection molding.

It is another object of the invention to provide a bird feeder that is modular in structure.

It is still another object of the invention is to provide a bird feeder that be resistant to water entering the feed chambers.

It is still a further object of the invention to provide a bird feeder design that can be fabricated in various cross sections.

These and other objects of the invention will become apparent from the following description, drawing and claims.

SUMMARY OF THE INVENTION

The present invention, in its simplest form, provides a stackable bird feeder module. The bird feeder module has a feeder sidewall with a top rim and a bottom rim. A base is attached to the feeder sidewall and, in combination with the feeder sidewall, forms a central cavity for holding feed in the bird feeder module. A port, and preferably multiple ports, are provided to allow birds access to the feed contained in the central cavity of the bird feeder module. Each port is provided with a perch positioned such that a bird can alight on the perch to feed. The modules are designed so that they can be stacked to form a nested array of bird feeder modules.

The nesting of the bird feeder modules to form a stacked array is facilitated by configuring the top rim and the bottom rim of the bird feeder modules such that the top rim of the module will slidably engage the bottom rim of a module stacked above; the bottom rim of the module will slidably engage the top rim of a module stacked below.

A feed passage is provided in the base which communicates with the central cavity of the bird feeder module. A baffle surrounds the passage and extends away from the central cavity of the bird feeder module.

It is preferred that the baffle extend below the bottom rim of the bird feeder module such that when the bird feeder module is stacked on a lower bird feeder module, the baffle extends into the central cavity of the lower bird feeder module a distance D sufficient to prevent feed from overflowing the ports of the lower bird feeder module.

For a stacked array of bird feeder modules that are identical, this distance D can be expressed in terms of parameters of the feeder modules. When modules have a height H, the ports are positioned at a constant distance L from the bottom rim of the modules, and an overlap of 0 is provided between the bottom rim and the top rim, it is preferred that the baffle extend below the bottom rim by a distance of about D.

Where: $D = H - L - O.$ (1)

The distance D will depend in part on the type of feed employed. When the feed is highly symmetric and approaches a spherical shape such as millet, the distance D will preferably be the full length described by Equation 1. When less symmetric feed such as sunflower seed is employed or as the diameter of the feeder is relatively large (eg. greater than about four inches), the distant D may be reduced by about 1/10 of the distance of the port.

In one preferred embodiment, the stackable bird feeder module has a cylindrical sidewall. When the stackable bird feeder modules are cylindrical, it is preferred that the rims twistably engage. For such modules, threaded rims or bayonet type couplings are preferred.

To increase the feed storing capacity of a feeder employing the stackable bird feeder module described above, additional feed storage modules can be used in combination with bird feeder modules. The feed storage modules are identical to the bird feeder modules described above, with the exception that these modules are port and perch free.

A tube type feeder, generated from a stacked array of bird feeder modules and storage modules described above, will have an open top and bottom opening. It is preferred that a roof cap be provided to terminate the open top of a feeder resulting from stacking a series of the bird feeder and feed storage modules. The roof cap has an upper surface and a lower surface. The upper surface is preferably provided with a hanging fixture such as a hook or eye. The lower surface is provided with a roof rim which is configured to engage the top rim of either a bird feeder module or feed storage module.

To close the bottom opening in an array of stacked modules, it is preferred that a terminating bird feeder module be employed. This terminating bird feeder module is identical to the stackable bird feeder module described above with the exception that a passage is not provided in the base and there is no baffle. Furthermore, the bottom rim no longer needs to be configured to engage the top rim of another unit. The terminating module preferably is provided with a pole mounting fixture which can be a depression in the base of the terminating bird feeder module of sufficient depth to engage the pole onto which the bird feeder will be mounted.

In another preferred embodiment, the stackable bird feeder module has a sidewall which generates a conduit with a polygonal cross section. For such embodiment, it is preferred that the rims of the modules slidably engage to form a mating surface and that protrusions such as pins are provided to one of the rims which engage depressions such as slots or passages in the mating rim.

The invention will be described in greater detail in the following description, associated figures, and claims.

BEST MODE OF CARRYING THE INVENTION INTO PRACTICE.

Figure 1:
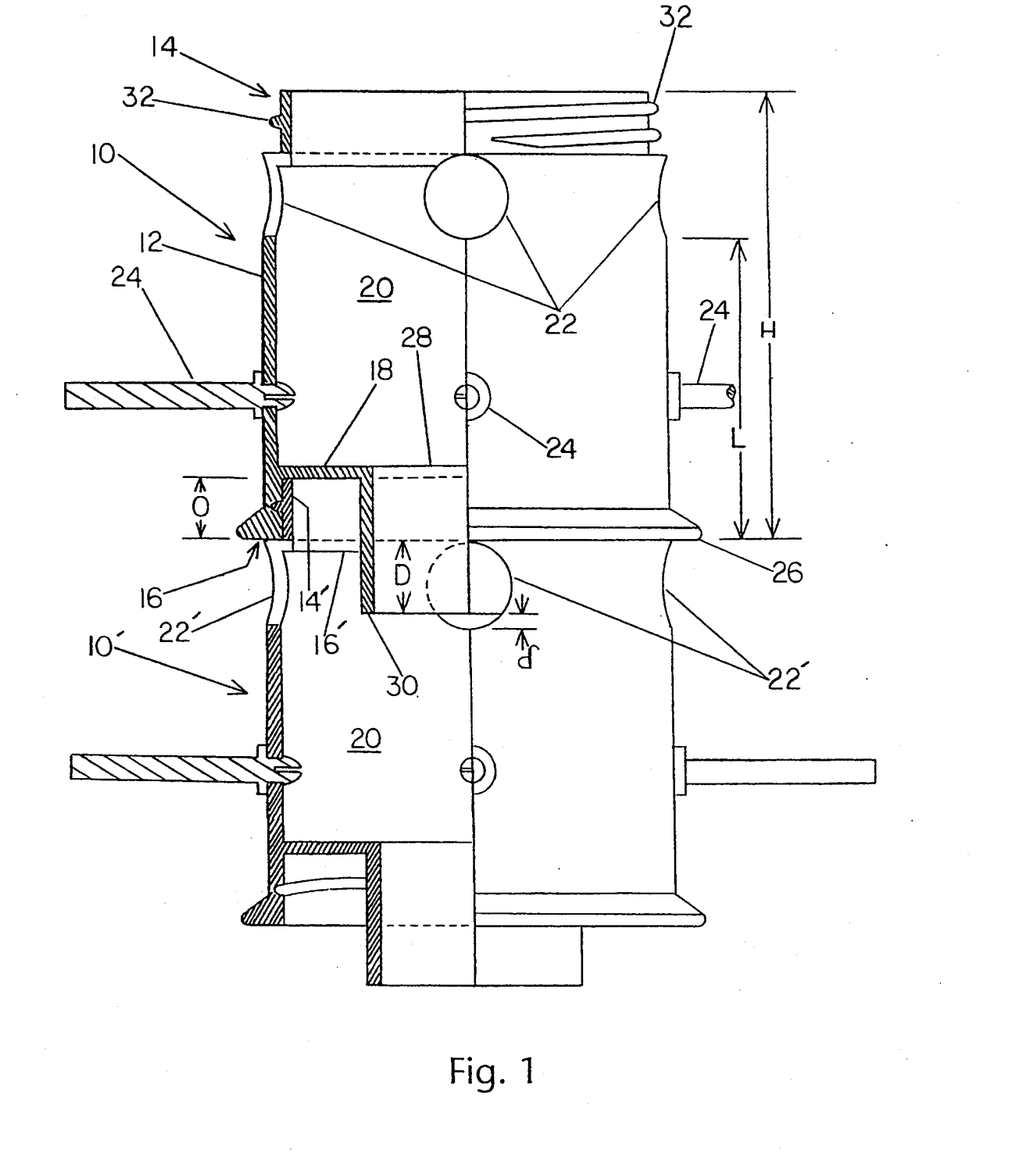
FIG. 1 illustrates a pair of stackable bird feeder modules of one embodiment of the present invention. In this embodiment, the modules have cylindrical sidewalls. The modules are configured such that the lower rim of the upper module circumscribes the upper rim of the module below and the rims are threaded so that they engage by twisting.

FIG. 1 illustrates one embodiment of the present invention where a pair of modules 10 and 10' are employed. The bird feeder module 10 has a feeder sidewall 12 with a top rim 14 and a bottom rim 16. A section of the sidewall 12 of the modules 10 and 10' have been removed to show internal details and a sidewall cross section. A base 18 is attached to the feeder sidewall 12 and, in combination with the feeder sidewall 12, forms a central cavity 20 for holding feed in the bird feeder module 10.

The stackability of the bird feeder modules results from configuring the top rim 14 and the bottom rim 16 such that the bottom rim 16 of the bird feeder module 10 will engage the top rim 14' of the bird feeder module 10' on which bird feeder module 10 is stacked. When the modules 10 and 10' are stacked, the top rim 14' of the feeder module 10' and the bottom rim 16 of the feeder module 10 overlap by a distance 0.

As illustrated in FIG. 1, the bottom rim 16 is external, circumscribing the top rim 14' when the bird feeder module 10 is engaged with the bird feeder module 10'. Having the bottom rim 16 circumscribe the top rim 14' increases the water resistance of the resulting stacked array of modules.

Ports 22 are provided in the feeder sidewall 12 to allow birds access to the feed contained in the central cavity 20 of the bird feeder module 10. The ports 22 are provided with perches 24 which are positioned such that a bird can alight on the perches 24 to feed.

Preferably, a drip lip 26 is provided to the bottom rim 16 of the feed module 10. The drip lip 26 directs water which runs down the sidewall 12 away from top rim 14' of the feed module 10'. Having the water so diverted will reduce the likelihood of water entering the central cavity 20 through the ports 22.

A feed passage 28 is provided in the base 18 of the bird feeder module 10 which communicates with the central cavity 20 of the bird feeder module 10'. A baffle 30 surrounds the passage 28 and extend below the central cavity 20 of the bird feeder module 10.

It is preferred that the baffle 30 extend below the bottom rim 16 at a distance D such that when the bird feeder module 10 is placed on the bird feeder module 10' the baffle 30 extends into the central cavity 20' of the lower bird feeder module 10' a distance sufficient to prevent feed from overflowing the ports 22' of the bird feeder module 10'. The distance D needed will be a function of the feed employed; when nearly spherical feed such as millet is used, the distance D will be greater than when less symmetrical feed such as sunflower seeds are used.

When the modules are identical so that the ports 22 are all positioned at a distance L from the bottom rim 16 of the modules, the modules have a common height H, and the overlap between the rims will be a constant value 0; it is then preferred that for very symmetric feed such as millet, the baffles 28 have a distance D such that:

$$D = H - L - O.$$

When less spherical feed is employed, such as sunflower seed, or the feeder diameter becomes relatively large (eg. greater than about four inches) the distance can be reduced by about 1/10 of the distance of the port, $\delta$.

When the stackable bird feeder modules have cylindrical sidewalls 12, as is shown in FIG. 1, it is preferred that the rims twistably engage. Threads 32 offer one preferred means to attach the cylindrical modules shown in FIG. 1.

Figure 2:
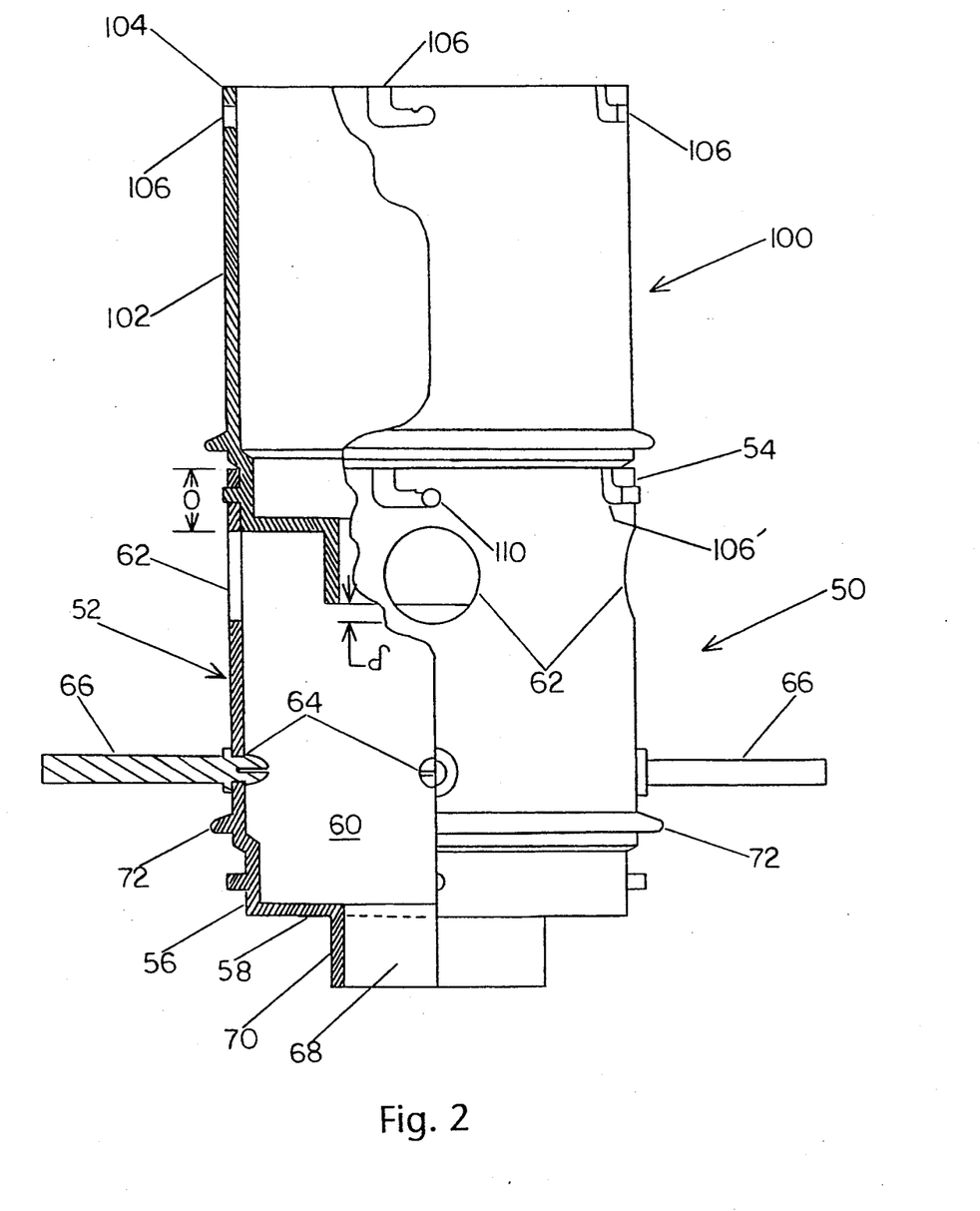
FIG. 2 is another embodiment for a bird feeder of the present invention where a bird feeder module and a feed storage module are shown. The bird feeder module and the feed storage module have cylindrical sidewalls and are coupled with a bayonet type coupling. The bird feeder module and the feed storage modules of FIG. 2 have a sidewall and rim configuration which is particularly well suited to be fabricated by injection molding.

FIG. 2 illustrates another embodiment for a bird feeder of the present invention which is based on modules having cylindrical walls. FIG. 2 shows a cylindrical bird feeder module 50 which shares many features in common with the bird feeder module 10 of FIG. 1. FIG. 2 shows part of a sidewall 52 removed, illustrating part of the module in cross section.

The sidewall 52 of the bird feeder module 50 has a top rim 54 and a bottom rim 56. The sidewall 52 of the bird feeder module 50, because of its rim configuration, is particularly well suited for injection molding. A base 58 is attached to the wall 52. The feeder sidewall 52 and the base 58 define a central cavity 60. Ports 62 are provided in the feeder sidewall 52 to allow access to the feed contained in the central cavity 60. Perch holes 64 are provided in the sidewall 52 and into these perch holes 64 snap-in perches 66 are inserted. A passage 68 is provided in the base 58. The passage 68 communicates with the central cavity 60. A baffle 70 surrounds the passage and extends below the lower rim 56 of the bird feeder module 50.

The bird feeder module 50 of FIG. 2 differs from the bird feeder modules 10 and 10' of FIG. 1 in that the top rim 54 is configured such that it is external and circumscribes the bottom rim 56 when the rims are engaged. This configuration makes for simpler manufacturing, however, reduces the water resistance of overlapped region between a bottom rim 56 and a top rim 54 as compared to the overlapped region between modules of the configuration of FIG. 1. A drip lip 72 increases the water resistance of the overlapped region between mating rims and also provides additional protection for the feeder ports 62 from water which might otherwise be carried into the central cavity 60 through the ports 62 in the sidewall 52.

To increase the storage capacity of the bird feeder module 50 shown in FIG. 2, a storage module 100 can be added, as shown. Again, for this section of the figure, part of a sidewall 102, has been removed to show a partial sectional view. The storage module 100 has the same basic design as the bird feeder module 50 with the exception that it is perch free and port free.

Figure 3:
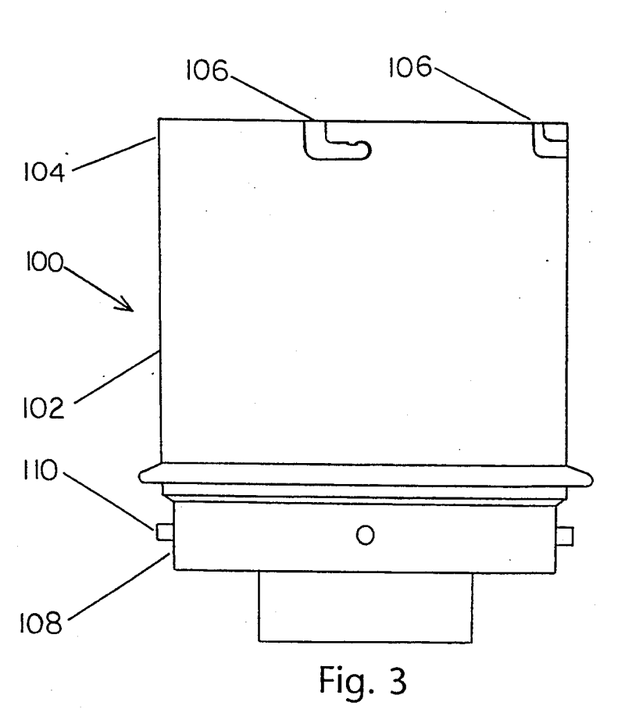
FIG. 3 illustrates the feed storage module of FIG. 2 without a bird feeder module attached.

The storage module 100, as shown in FIGS. 2 and 3, has a sidewall 102 which is hole free. The top rim 104 is provided with grooves 106 and the bottom rim 108 (best illustrated in FIG. 3) is provided with pins 110. The pins 110 in turn mesh with the grooves 106 of another storage module. Alternatively, as shown in FIG. 2, the storage module 100 can be coupled to a feed module 50 in which case the pins 110 of the storage module 100 will engage the grooves 106' in the bird feeder module 50. In either case, the pins and groves form a bayonet coupling between the modules.

Figure 6:
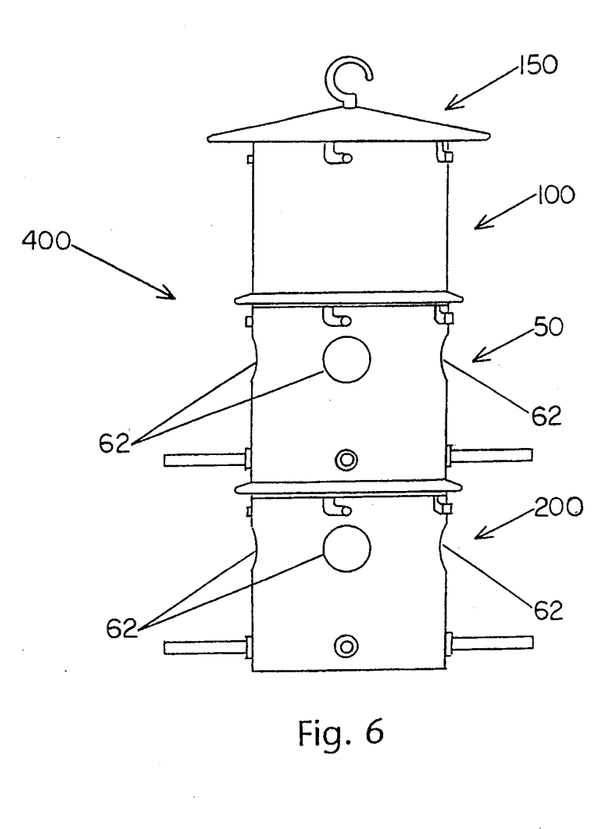
FIG. 6 illustrates a bird feeder which is constructed with the modules of FIGS. 2 through 5.

In order to terminate a stacked array of feeder modules 50 and storage modules 100 such as shown in FIG. 6, terminating modules are provided.

Figure 4:
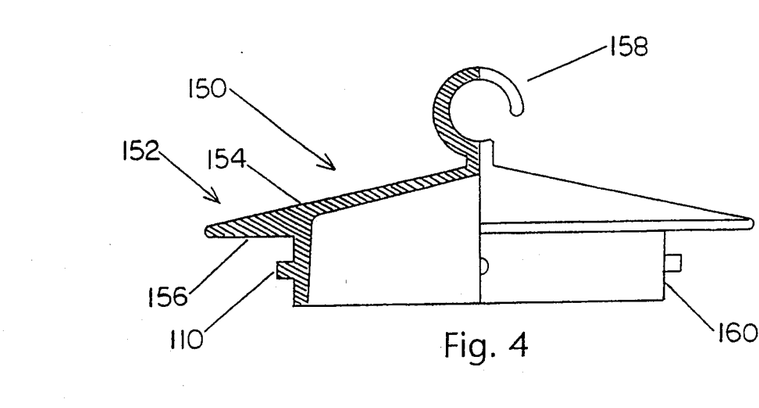
FIG. 4 illustrates a feeder roof cap configured to close the upper end of a stacked array of bird feeder modules shown in FIG. 2 or, if greater storage capacity for feed is sought, the feeder roof cap can be employed to close the feed storage module shown in FIGS. 2 and 3.

A feeder roof cap 150, shown in FIGS. 4 and 6, is provided to close the upper most bird feeder module 50 or storage module 100. Referring to FIG. 4, the feeder roof cap 150 has a roof section 152 which has a top surface 154 and a bottom surface 156. A hook or hanger 158 is attached to the top surface 154 to suspend the feeder roof cap 150. The bottom surface 156 is provided with a cap rim 160 which is contoured to engage the top rim 54 of a bird feeder module 50, shown in FIG. 2, or the top rim 104 of the storage module 100, shown in FIGS. 2 and 3.

Figure 5:
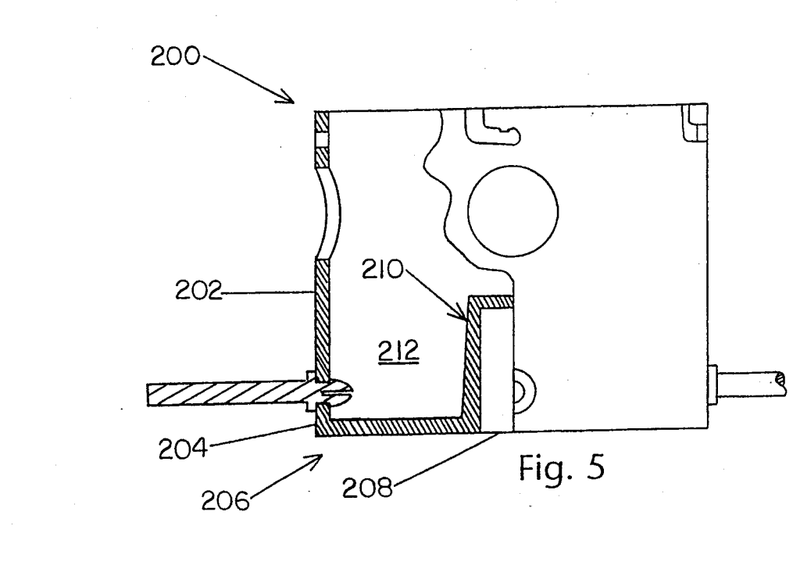
FIG. 5 is a terminating bird feeder module which is designed to be used in combination with the bird feeder module shown in FIG. 2, or the feed storage module shown in FIGS. 2 and 3, and the roof cap of FIG. 4.

FIG. 5 shows a terminating feeder module 200, designed to be used in combination with the feeder module 50 of FIG. 2 or with the storage module 100 of FIGS. 2 and 3. Again, FIG. 5 shows the module with a section of a sidewall 202 removed. The terminating feeder module 200 is substantially similar to the feeder module 50 of FIG. 2, with the exception of the bottom rim 204 and the base 206. The bottom rim 204 is not designed to engage a top rim of another module, but rather to provide a finished appearance to the bottom of the feeder. Also, the base 206 does not have a passage therethrough. The base 206 has a depression 208 therein which is designed to engage a pole, not shown, on which the terminating feeder module 200 can be mounted. The depression 208 therein preferably creates a protrusion 210 within the central cavity 212 thereby reducing the quantity of feed required to fill the terminating feeder module 200.

FIG. 6 shows a stacked array 400 of the modules shown in FIGS. 2 through 5 and provides a bird feeder suitable for hanging or post mounting. Although the stacked array feeder 400 of the embodiment shown in FIG. 6 is similar in appearance to the prior art tube feeders discussed in the background of the invention, there are substantial differences. The stacked array feeder 400 is constructed of modules and thus, the configuration can be modified with respect to the number of feed ports 62 by varying the ratio of feed storage section 402 to feeder module section 404 of the stacked array feeder 400.

The stacked array has shown in FIG. 6 has baffles 30 (best shown in FIGS. 2 and 3) which extend into the cavity of the module below such that $\delta = 0$. As shown in FIG. 6, the stacked array feeder 400 would be well suited for using millet as the feed. Since the stacked array feeder 400 may be disassembled by twisting the modules to separate, the components can readily be cleaned by washing them in the dishwasher. Cleaning of the feeder modules not only enhances the appearance of the bird feeder, but also eliminates spoiled food and its harmful effects on the birds feeding at a feeder.

While the embodiments shown in FIGS. 1 through 6 are for bird feeders where the modules have cylindrical sidewalls, such is not a limitation of the invention. The invention can be practiced with modules having sidewalls which form conduits having polygonal cross sections. However, the symmetry of the polygons having an even number of sides makes such preferred.

Figure 7:
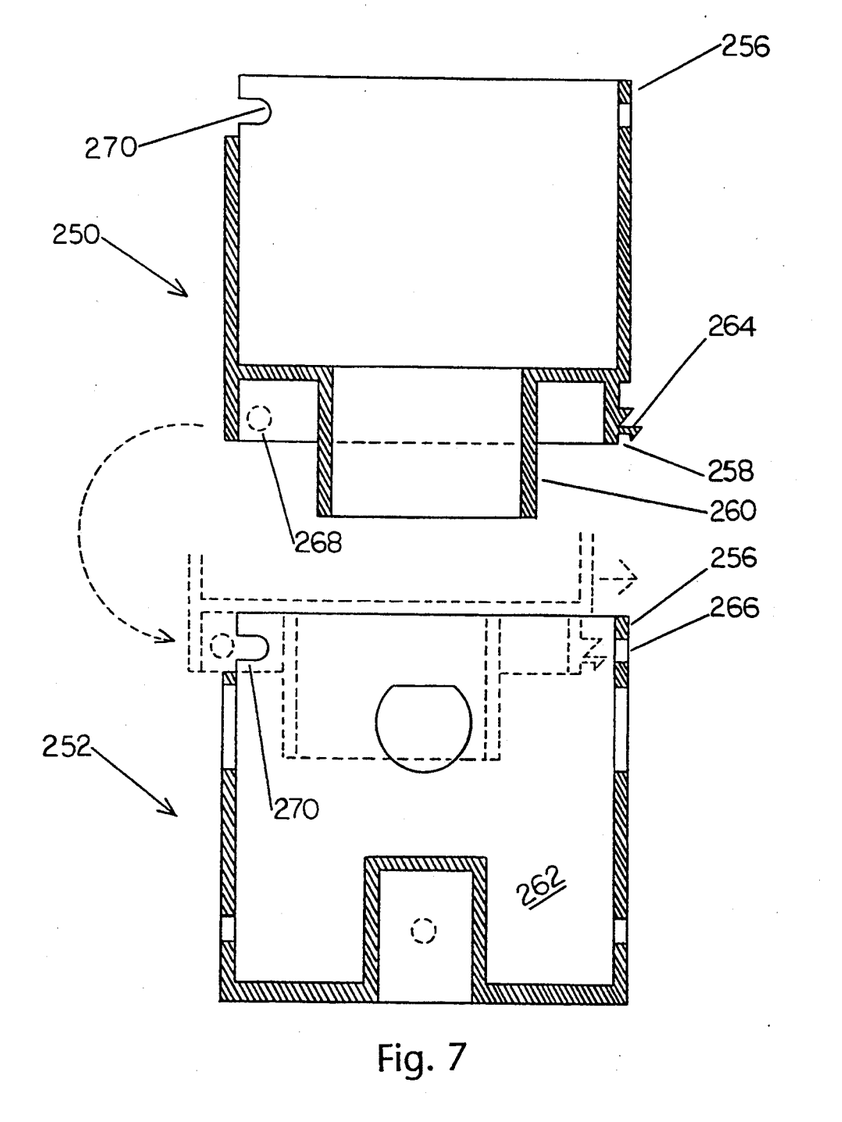
FIG. 7 is a side view in cross section of a terminal bird feeder module and feed storage module having sidewalls composed of planar facets which generate conduits having square cross sections.
Figure 8:
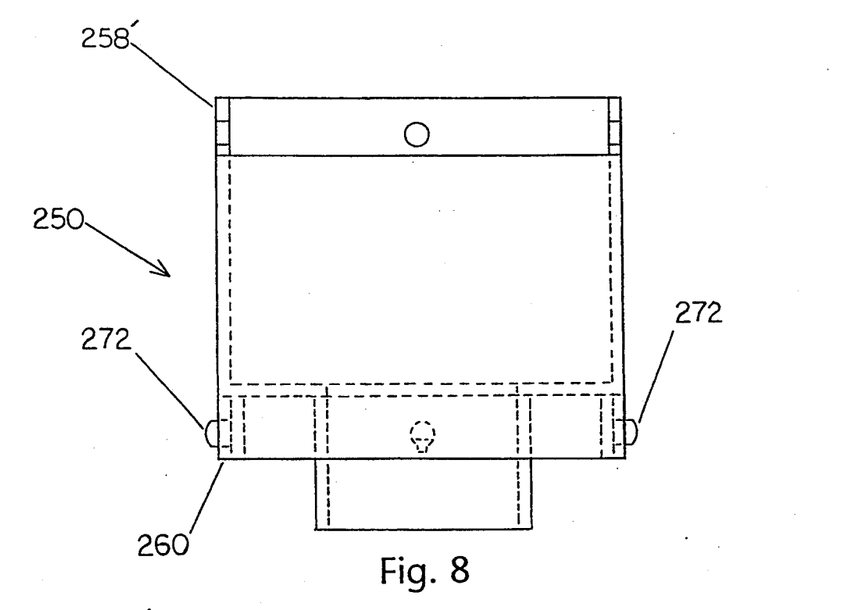
FIG. 8 is a rear view of the feed storage module of FIG. 7.
Figure 9:
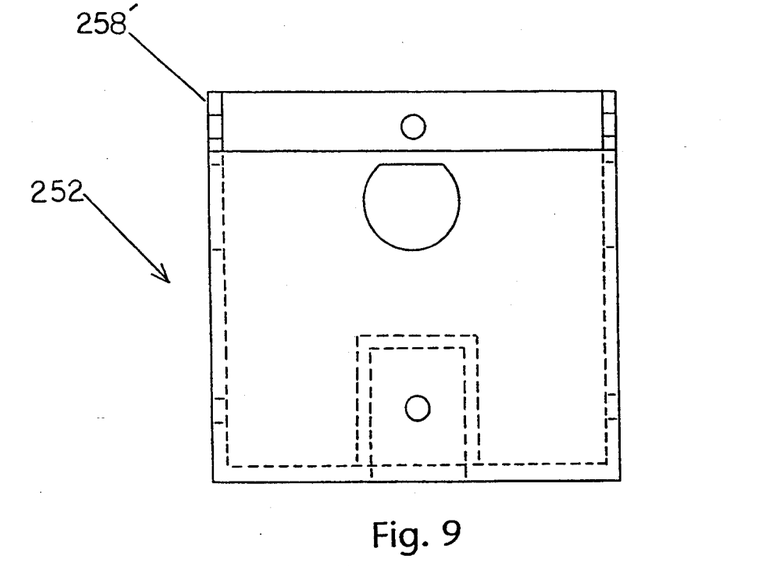
FIG. 9 is a rear view of the bird feed module of FIG. 7.

FIGS. 7 through 11 illustrate side cross-sectional views, rear views, and top views of a feed storage module 250 and a companion terminating feeder module 252. In this embodiment, the modules, rather than having a cylindrical wall, have faceted walls. The sidewall for both the feed storage module 250 and terminating feeder module 252, as shown in FIGS. 7 through 11 form a square conduit 254 formed by planar facets 256 and shown in cross section in FIGS. 10 and 11. The feed storage module 250 has a top rim 258 and a bottom rim 260, as illustrated in FIGS. 7 and 8. The terminating feeder module shown in FIG. 9 has a top rim 258' which has the same configuration as the top rim 258 of the feed storage module 250. Again, the rims are configured such that the bottom rim 260 of the feed storage module 250 will slidably engage the top rim 258' of the terminating feeder module 252.

The feed storage module 250 has a base 262 having a passage 264 therethrough. The passage is surrounded by a baffle 266. The broken lines drawn in FIG. 7 indicate the path for engaging the storage module 250 on the terminating feed module 252. As indicated, the feed storage module 250 is lowered into position where a baffle 266, of the feed storage module 250 is positioned in the cavity 268 of the terminating feeder 252. The arrow indicates the translation of the feed storage module 250 with respect to the terminating feeder module 252 that will cause a latch 270 on the lower rim 260 of the feed storage module 250 to engage a latch hole 272 in the upper rim 258' of terminating feed module 252. This motion will also cause the pins 274 on the lower rim 260 of the feed storage module 250 to engage slots 276 in the upper rim 258' of the terminating feeder module 252. When the pins 274 engage the slots 276 and the latch 270 engages the latch hole 272, the lower rim 260 of the feed storage module 250 is secured to the top rim 258' of the terminating feeder 252. When so positioned, the feed storage module 250 slides such that the planar elements 256 are aligned and the pins 274 engage the slots 276 and the latch 270 engages the latch hole 272. In this embodiment, the pins 274 and the latch 270 serve as the protrusions which engage slots 276 and latch hole 272 which serve as the depression into which the protrusions are engaged.

For a pole supported bird feeder, the force of gravity will hold the feeding modules intact, providing the overlap O is sufficient to avoid dislodging by the movement created as the feeder sways on the pole and the protrusions and depressions may be omitted.

Figure 10:
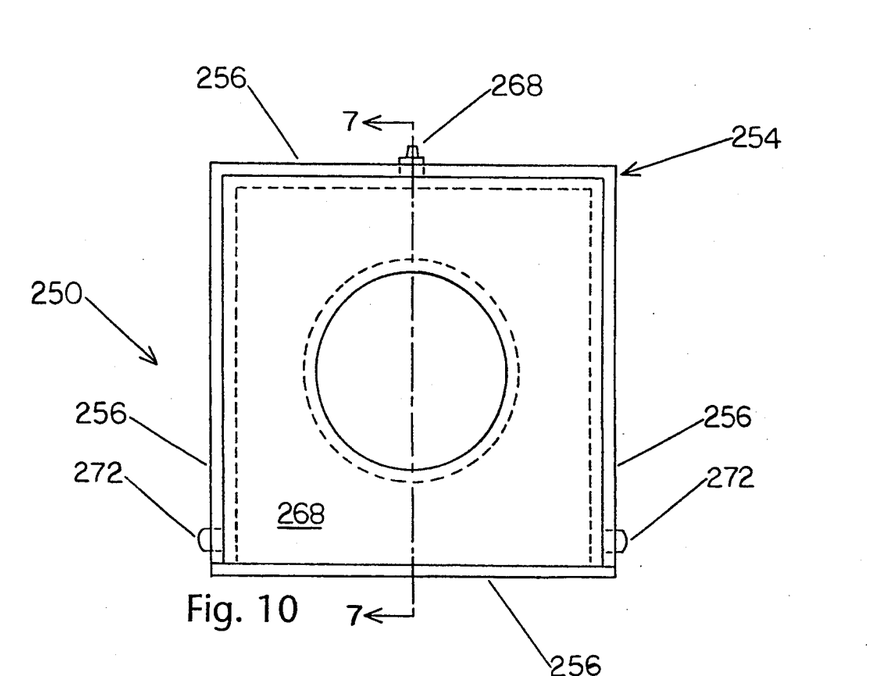
FIG. 10 is a top view of the feed storage module of FIGS. 7 and 8.
Figure 11:
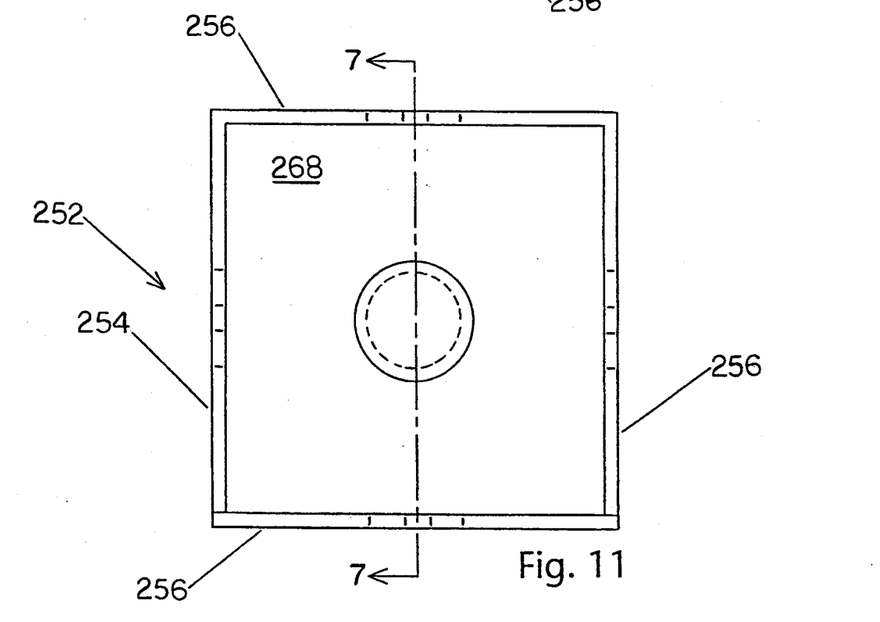
FIG. 11 is a top view of the bird feed module of FIGS. 7 and 9.
Figure 12:
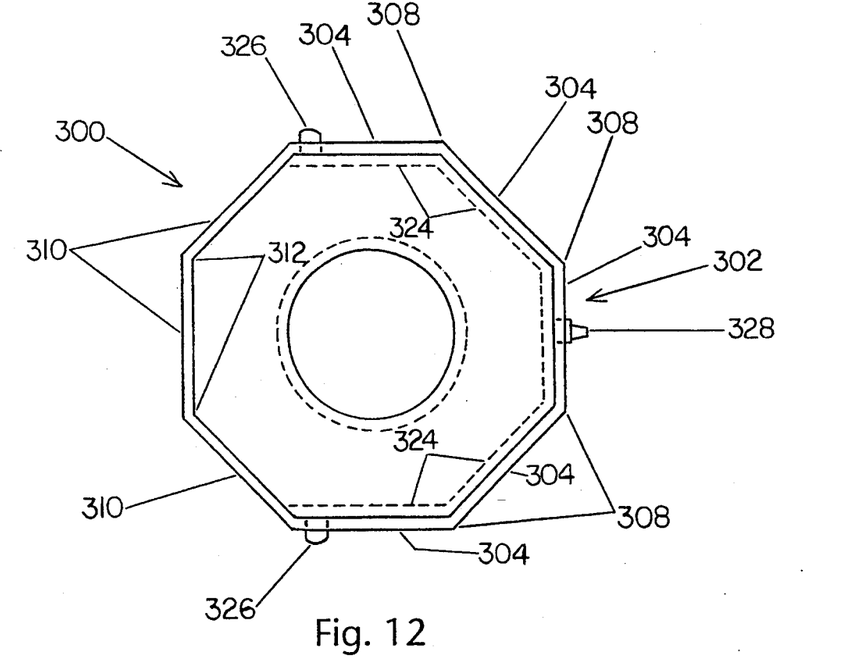
FIG. 12 is a top of a feed storage module which has a sidewall with eight planar facets which generates a conduit having an octagonal cross section.
Figure 13:
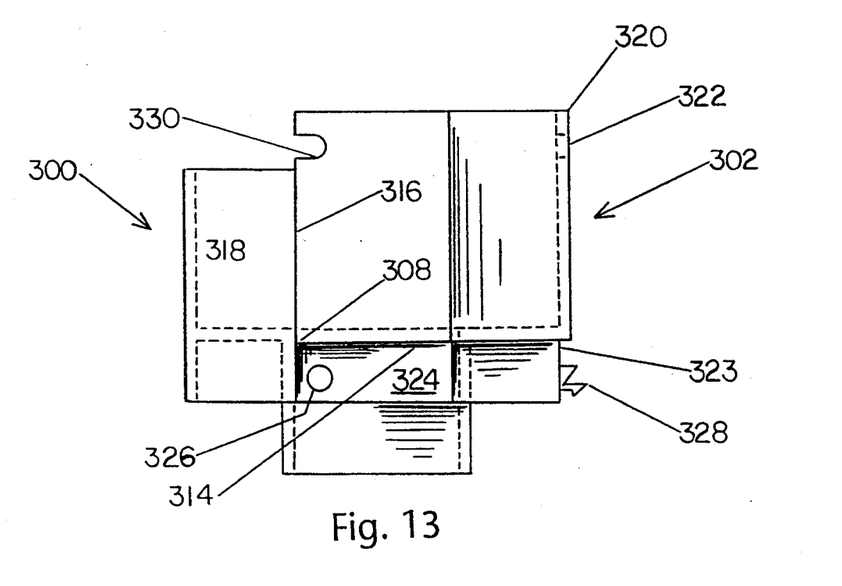
FIG. 13 is a side view of the storage module of FIG. 12.

FIG. 10 shows a top of an octagonal feed storage module which, in combination with other octagonal shaped modules, will form a bird feeder. FIG. 13 shows a side view of the octagonal feed storage module shown in FIG. 12.

The storage module has a sidewall 302 with eight planar facets of equal size. A first section of the sidewall 302 has five facets 304 joined such that their adjoining edges 308 are coincident. A second section of the sidewall 302 has the remaining three facets 310, joined such that their adjoining edges 312 are also coincident. The first section of the sidewall 302 which is composed of the five facets 304 is offset with respect to the second section of the sidewall 302 which is composed of the three facets 310, generating steps 314 at the junction between the connecting first section edges 316 and the connecting second section edges 318.

The sidewall 302, being so configured, provides a top rim 320 and a bottom rim 323 with steps 314 therein. The lower rim is provided by support extensions 324 which slidably engage a portion of the upper rim 320.

Protrusions such as pins 326 and a latch 328 are positioned on bottom rim 323. These pins 326 and latch 328 engage pin slots 330 and a latch hole 322 in the top rim 320 and serve to lock the top rim 320 with respect to the bottom rim 323.

It should be pointed out that for the polygonal conduits illustrated, the number of sides are even. Such are preferred since they provide parallel support extension which adds guidance to the movement of the modules as they are assembled.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described, except in so far as indicated by the scope of the appended claims.

What I claim:

1. A stackable bird feeder module comprising:
a feeder sidewall having a top rim and a bottom rim, said top rim configured to engage a bottom of a module stacked there above and said bottom rim configured to engage a top rim of a module stacked thereunder;
at least one port in said feeder sidewall, said at least one port having a perch associated therewith;
a base positioned below said at least one port having a passage there through, said base attaching to said feeder sidewall forming, in conjunction with said feeder sidewall, a central cavity in said stackable bird feeder module; and
a baffle surrounding said passage, said baffle extending away from said central cavity.

2. The stackable bird feeder module of claim 1 wherein said stackable bird feeder module is to be used with a lower stackable module having a lower central cavity and at least one lower module port for access to feed contained therein and further wherein said baffle extends below said bottom rim of said stackable feeder sidewall so that when said stackable bird feeder module is stacked on the lower stackable module, said baffle extends into the lower central cavity a distance sufficient to prevent feed from overflowing each of said at least one lower module port.

3. The stackable bird feeder module of claim 2 wherein said sidewall is cylindrical.

4. The stackable bird feeder module of claim 3 wherein said top rim and said bottom rim are configured to twistably engage.

5. The stackable bird feeder module of claim 2 wherein said sidewall is faceted to form a faceted conduit.

6. The stackable bird feeder module of claim 5 wherein said top rim and said bottom rim have mating surfaces, and further comprising protrusions and depressions in said mating surfaces of said top rim and said bottom rim for locking said top rim with respect to said bottom rim.

7. The stackable bird feeder module of claim 6 wherein said protrusions are pins and latches, and said depressions are slots and latch holes.

8. The stackable bird feeder module of claim 7 where said feeder sidewall has n facets and n is divisible by 2.

9. A stackable feed storage module comprising:
a storage bin sidewall having a top rim and a bottom rim,
said top rim configured to engage a bottom of a module stacked there above and said bottom rim configured to engage a top rim of a module stacked thereunder;
a base having a passage therethrough, said base attaching to said storage bin sidewall forming in conjunction with said storage bin sidewall a central cavity in said stackable feed storage module; and
a baffle surrounding said passage, said baffle extending away from said central cavity.

10. The stackable feed storage module of claim 9 wherein said module is to be used with a lower stackable bird feeder module having a lower central cavity and a port for access to feed contained therein and further wherein said baffle extends below said lower rim of said feeder sidewall so that when said feeder module is stacked on the lower stackable bird feeder module, said baffle extends into the lower central cavity a distance sufficient to prevent feed from overflowing the port of the lower bird feeder module.

11. The stackable feed storage module of claim 10 wherein said sidewall is cylindrical.

12. The stackable feed storage module of claim 11 wherein said top rim and said bottom rim are configured to twistably engage.

13. The stackable feed storage module of claim 9 wherein said sidewall is faceted to form a faceted conduit.

14. The stackable feed storage module of claim 13 wherein said top rim and said bottom rim have mating surfaces and further comprising protrusions and depressions in said mating surfaces of said top rim and said bottom rim for locking said top rim with respect to said bottom rim.

15. The stackable feed storage module of claim 14 wherein said protrusions are pins and latches, and said depressions are slots and latch holes.

16. The stackable feed storage module of claim 15 where said feeder sidewall has n facets and n is divisible by 2.

17. A terminating bird feeder module attachable to a attachable to a module there above, the module there above having a lower rim, the terminating bird feeder module comprising:
a terminating feeder sidewall having a top rim,
said top rim configured to engage the lower rim of the module stacked there above and receives an inwardly extending baffle of the module stacked thereabove;
at least one port in said feeder sidewall, said at port having a perch associated therewith; and
a base attaching to said sidewall forming, in conjuction with the feeder sidewall, a central cavity in the stackable bird feeder module.

18. The terminating bird feeder module of claim 17 wherein said base has an indentation therein for insertion of a mounting post.

19. The terminating bird feeder module of claim 18 wherein said sidewall is cylindrical.

20. The terminating bird feeder module of claim 19 wherein said top rim is configured to twistably engage.

21. The terminating bird feeder module of claim 17 wherein said sidewall is faceted to form a faceted conduit.

22. The terminating bird feeder of claim 21 wherein said top rim and the lower bottom rim of the module there above have mating surfaces, and further comprising protrusions and depressions in said mating surfaces in said top rim and the lower rim for locking said top rim with respect to the lower rim.

23. The terminating bird feeder module of claim 22 where said feeder sidewall has n facets and n is divisible by 2.

24. A bird feeder comprising:
at least one stackable bird feeder module comprising,
a feeder sidewall having a top rim and a bottom rim,
said top rim configured to engage a bottom of a module stacked there above and said bottom rim configured to engage a top rim of a module stacked thereunder;
at least one port in said feeder sidewall, said at least one port having a perch associated therewith;
a base having a passage there through, said base attaching to said sidewall forming, in conjunction with the feeder sidewall, a central cavity in the stackable bird feeder module:
a baffle surrounding said passage, said baffle extending away from said central cavity;
at least one stackable feed storage module comprising,
a storage bin sidewall having a top rim and a bottom rim,
said top rim configured to engage a bottom of a module stacked thereunder and said bottom rim configured to engage a top rim of a module stacked there above;
a base having a passage there through, said base attaching to said storage sidewall forming in conjunction with said storage sidewall a central cavity in said stackable storage module;
a baffle surrounding said passage, said baffle extending away from said central cavity;
a terminating bird feeder module comprising,
a terminating feeder sidewall having a top rim,
said top rim configured to engage a bottom of a module stacked there above;
at least one port in said feeder sidewall, said at least one port having a perch associated therewith;
a base attaching to said sidewall forming, in conjunction with the feeder sidewall, a central cavity in the stackable bird feeder module; and
roof cap having,
a roof section having a top surface and a bottom surface, a cap rim attached to said bottom surface,
said cap rim configured to engage said top rim of either said feed module or said storage module.

25. The bird feeder of claim 24 wherein said feeder sidewall, said storage bin sidewall and said terminating feeder sidewall are cylindrical.

26. The bird feeder of claim 25 wherein said top rim and said bottom rim of said feeder sidewall, said top rim and said bottom rim of said storage bin sidewall, said top rim of said terminating feeder sidewall and said cap rim are configured to twistably engage.

27. The bird feeder of claim 24 wherein said feeder sidewall, said storage bin sidewall and said terminating feeder sidewall are faceted to form a faceted conduit.

28. The bird feeder of claim 27 wherein said top rim and said bottom rim of said feeder sidewall, said top rim and said bottom rim of said storage bin sidewall, said top rim of said terminating feeder sidewall and said cap rim have mating surfaces, and further comprising protrusions and depressions in said mating surfaces of said top rim and said bottom rim for locking said top rim with respect to said lower rim.

29. The bird feeder of claim 28 wherein said protrusions are pins and latches, and said depressions are slots and latch holes.

30. The bird feeder of claim 29 where said feeder sidewall has n facets and n is divisible by 2.

* * * * *